3,175,638
WELL LOGGER
Charles L. Hubbard, Bellaire, and Charles J. Charske and Donald H. Britton, Houston, Tex., assignors, by mesne assignments, to Jersey Production Research Company, Tulsa, Okla., a corporation of Delaware
Filed Aug. 31, 1960, Ser. No. 53,209
3 Claims. (Cl. 181—.5)

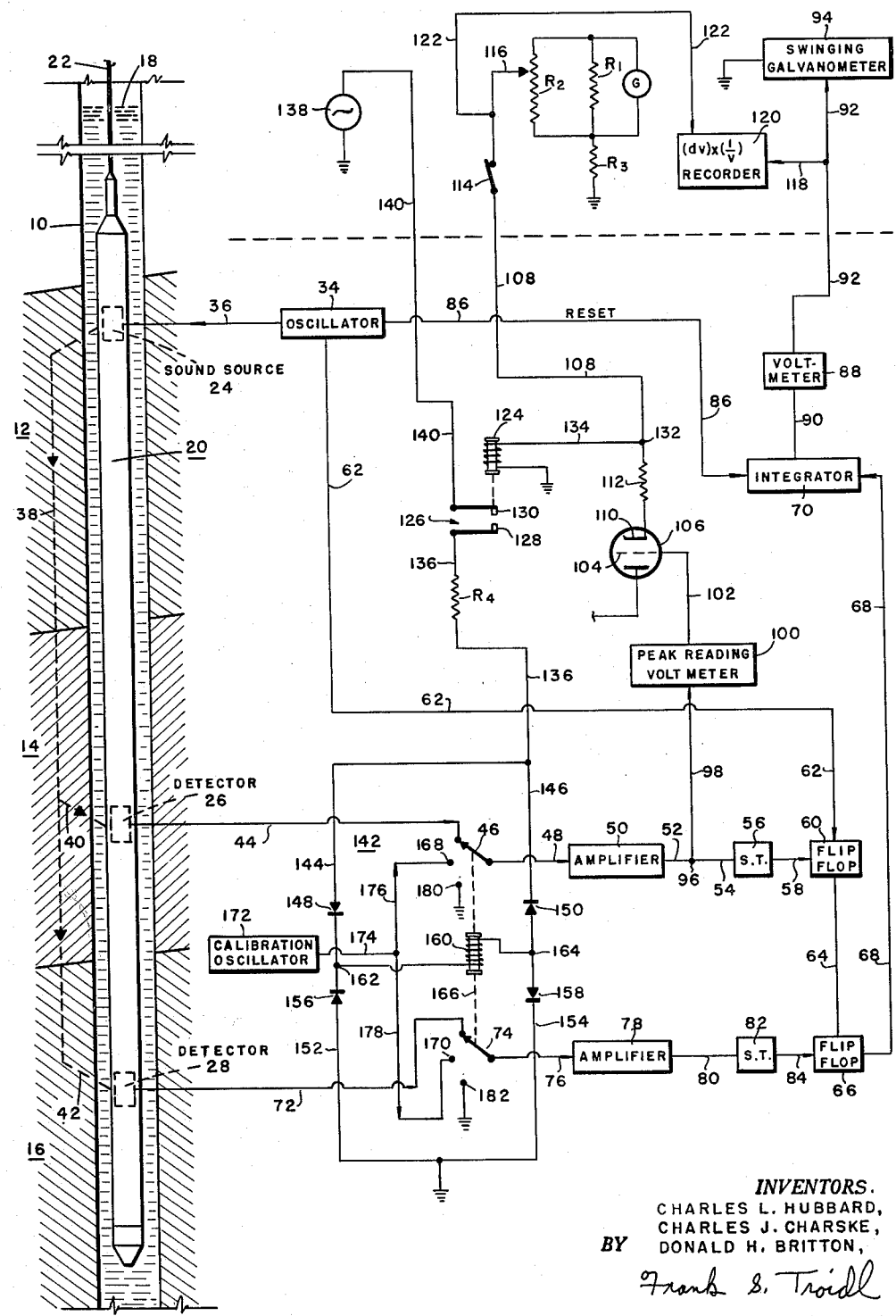

This invention relates to geophysical prospecting. More particularly, this invention is an improved logging tool which is lowered into a borehole and used to measure certain characteristics of subsurface formations.

Workers skilled in the art of well logging are continuously devising new methods and tools for obtaining more accurate measurements of various physical characteristics of subsurface formations. For example, information can be obtained about a subsurface stratum by measuring the velocity of sound through the subsurface stratum. Information can also be obtained by measuring the "acoustic impedance" of the subsurface formations. The "acoustic impedance" is defined as the velocity of sound through the formation times the density of the formation. The measurement of the "acoustic impedance" enables one to accurately determine the reflection coefficient of subsurface strata interfaces. The expression for the amplitude of the reflected signal if the incident signal has an amplitude of 1, is:

$$\text{Reflection coefficient} = \frac{d_1 v_1 - d_2 v_2}{d_1 v_1 + d_2 v_2}$$

where:
$d_1$=density of first medium
$d_2$=density of second medium
$v_1$=velocity of first medium
$v_2$=velocity of second medium Thus, it is obvious that reflection seismogram synthesis can be obtained using an acoustic impedance log.

Another physical characteristic of subsurface formations which workers skilled in the art would like to determine accurately is the density of the subsurface formations. Heretofore, however, accurate density measurements have been difficult or impossible to obtain. Accurate density measurements would be helpful, for example, in interpreting neutron logs which are often used as a means for detecting hydrocarbons, particularly gas, and in estimating saturation where porosity is known. However, the quantitative results are effected by the chemical content and density of the reservoir rocks. A density log, by providing the interpreter with information about the rocks, would make possible a more refined interpretation in terms of hydrocarbon content.

Density measurements which are accurate would also provide a gravity interpreter with a typical gravity section and enable him to more accurately visualize the subsurface features which contribute to observed gravity anomalies.

This invention provides the art with a tool which measures at one time and in one logging run the velocity, acoustic impedance, and density of the subsurface formations traversed by a borehole. An accurate determination of all of the foregoing physical characteristics is obtained by this tool.

Briefly described, this new tool includes a sound source and at least one sound detector. Circuitry is provided for continuously producing an electrical quantity output which is proportional to the reciprocal of the velocity $$\left(\frac{1}{v}\right)$$

The quantity $$\left(\frac{1}{v}\right)$$

is plotted linearly. Simultaneously, the acoustic impedance $(dv)$ is also indicated by measurement of a signal which is varied in accordance with the acoustic impedance of the subsurface formation and the signal recorded to provide a linear indication of the acoustic impedance.

The density of the subsurface formations is equal to $$\frac{dv}{v}$$

The new system includes a density recorder which receives as inputs, the output from both the reciprocal of the velocity measuring circuit and the acoustic impedance measuring circuit. The density recorder records a trace which in magnitude is proportional to the product of the input signals. Thus, the density recorder provides a trace which is proportional to $$d = (dv) \times \left(\frac{1}{v}\right)$$

The invention as well as its many advantages may be further understood by reference to the following detailed description and single drawing which is a schematic view partially in block form and partially an electric schematic diagram showing the general arrangement of the invention.

Referring to the drawing, a borehole 10 is shown traversing a plurality of subsurface formations, such as those indicated by numerals 12, 14, and 16. Generally, the borehole includes a fluid such as mud or other well fluids, the top of which is indicated by numeral 18.

A logging tool 20 is shown lowered in the well 10 and suspended by a cable 22.

The tool 20 includes therein a sound source 24, a first detector 26, and a second detector 28. Detectors 26 and 28 are spaced apart and located in a common direction from the sound source 24.

The sound source 24 may be any suitable source of sound such as an electro-acoustic transducer. The oscillator 34 controls the time of application of an electric pulse through lines 36 to the electro-acoustic sound source 24.

The acoustic pulses from the sound source 24 travel from the sound source toward the two detectors. These pulses are effected in two ways by the formation forming the walls of the borehole:

(1) A refractive path is followed by a small portion of the energy from each pulse. This refractive path is for the most part in the formation and forms the fastest path for the pulse to arrive at each pickup. The time for the pulse to travel from one point in the subsurface formation to a second point, the second point being the same distance from the first point as the distance between the pickups 26 and 28, is measured and transmitted to the surface as a measure of the reciprocal of velocity $$\left(\frac{1}{v}\right)$$

The refractive path is indicated by the broken lines 38, 40, and 42.

(2) Most of the energy from each pulse remains within the bore-hole, due to reflection. The amplitude of the reflected pulses detected by the detectors is dependent upon how much energy remains within the hole. The amount of energy remaining in the hole is, in turn, dependent upon the difference between the acoustic impedance of the formation being traversed and that the drilling fluid in the hole. For example, if the pulses are emitted at constant amplitude, since the acoustic impedance of} the fluid in the borehole remains substantially constant, variations in peak amplitude are caused by variations of acoustic impedance of the formations as the hole is traversed.

The detectors 26 and 28 are also electroacoustic transducers. Thus, as each pulse is emitted from source 24, the refracted path of the energy through lines 38 and 40 is detected by detector 26. In response to the detected pulse, an electric signal is fed from the detector 26 through line 44 and switch contact 46 (when the contact 46 is in the position shown in the figure) and the line 48 to the amplifier 50. The amplified signal from amplifier 50 is fed through lines 52 and 54 to the Schmitt trigger circuit 56. The Schmitt trigger circuit produces a sharp trigger pulse corresponding in time to the first pulse of the electric signal fed to the Schmitt trigger circuit. The pulse from Schmitt trigger circuit 56 is fed through line 58 to the flip-flop 60.

Upon receipt of the pulse from the Schmitt trigger 56, the flip-flop 60 which has been previously set by a signal fed from the oscillator 34 through line 62 produces an output signal through line 64 to the flip-flop 66. The signal through line 64 to flip-flop 66 causes a positive signal to be fed from flip-flop 66 through line 68 to an integrator circuit 70.

At some time later, the sonic pulse from sound source 24 is detected by the detector 28 and an electric signal is fed from detector 28 through line 72 and switch 74 and line 76 to the amplifier 78. The amplified signal from amplifier 78 is fed through line 80 to the Schmitt trigger circuit 82. The sharp output pulse from the Schmitt trigger circuit 82 is fed through line 84 to the flip-flop 66 to return the flip-flop to its original state. Hence, it can be seen that the width of the pulse fed from flip-flop 66 through line 68 to the integrator 70 is proportional to the time it takes the sound to travel through the subsurface formation a distance equal to the spacing between detectors 26 and 28.

The integrator circuit 70 includes a capacitor therein which is used to receive and store the signal from flip-flop 66. The amount of signal stored in the capacitor is proportional to the width of the pulse from flip-flop 66. When the reset signal from oscillator 34 is fed through line 86 to the integrator 70, a relay included as a part of the integrator circuit 70 is closed to short the capacitor in the integrator 70.

The stored signal from integrator 70 is fed to a voltmeter 88 through line 90. The output of voltmeter 88 is proportional to the reciprocal of the velocity through the subsurface formation. This output is fed through line 92 to a galvanometer such as swinging galvanometer 94. The galvanometer produces a record trace which in amplitude is proportional to the reciprocal of the velocity.

The new system also includes an acoustic impedance measuring circuit which is electrically associated with at least one of the detectors. In the drawing, the acoustic measuring circuit is shown as associated with the detector 26.

The acoustic impedance measuring circuit is connected to the circuit of detector 26 at the junction 96 of lines 52, 54, and 98. Line 98 leads to a peak reading voltmeter 100.

The output from the peak reading voltmeter 100 is a current which is proportional to the acoustic impedance ($dv$). This signal is fed through line 102 to the grid 104 of a vacuum tube 106. If desired, line 102 could lead directly to the recording equipment at the surface of the earth rather than to the grid 104 of a vacuum tube 106. However, it is preferred that the signal be fed to the vacuum tube 106 to reduce the number of conducting lines in the conducting cable leading to the earth's surface. With this arrangement, a common line is used for the acoustic impedance signal and for actuating a step switching mechanism in the logging tool 20. The switching mechanism will be subsequently described.

The electronic tube 106 is always conducting and will cause an electric current to be fed through line 108 including the cathode 110 with cathode resistor 112 through a normally closed switch 114 to a galvanometric measuring circuit at the earth's surface including a small resistor $R_1$ and a small resistor $R_2$ tapped by tap 116. The galvanometric measuring circuit is grounded through resistor $R_3$. The galvanometer is connected to a recorder (not shown) and a trace is recorded which is proportional to the acoustic impedance ($dv$). The acoustic impedance curve is a time average of the amplitude of several successive pulses, due to the time constant of the system including the peak reading voltmeter 100 and the galvanometer circuit.

The signal through line 92 which is proportional to $$\left(\frac{1}{v}\right)$$

in addition to being fed to galvanometer 94 is fed through line 118 to recorder 120. The signal from voltmeter 100 which is proportional to ($dv$) is not only fed through 108, switch 114, and tap 116 to the galvanometer circuit including resistors $R_1$, $R_2$ and $R_3$ but is also fed through line 122 to the recorder 120. The recorder 120 is a circuit of the type which will produce a trace which is proportional to the product of its input signals. Hence, the trace produced by recorder 120 is proportional to $$(dv) \times \left(\frac{1}{v}\right)$$

or $d$=density. The recorder 120, for example, may include as a part thereof a recently developed galvanometer which utilizes the conventional moving coil with a mirror and an electromagnetic field. If we pass a current proportional to $$\left(\frac{1}{v}\right)$$

through the moving coil and a second current proportional to ($dv$) through the field coil, the deflection will be proportional to the product ($d$).

The measurements of the acoustic impedance and the reciprocal of the velocity as well as the density must be calibrated. One system for permitting the operation of the calibration circuits at the will of the operator will now be described.

An iron core relay 124 for operating a normally open switch 126 having contacts 128 and 130 is connected to the junction 132 of line 108 by line 134. The internal resistance of the relay 124 is much greater than the resistance of $R_1$ and $R_2$. The resistance of relay 124 may be ten times the resistance of $R_1$ and $R_2$. Because of the high resistance of coil 124, when the switch 114 is closed, the current from the voltage source through tube 106, resistance 112, line 108, and closed switch 114 is proportional to the acoustic impedance of the subsurface formation being measured.

However, when the operator opens the switch 114, the relay 124 is actuated by current fed through said relay to close the contacts 128 and 130 of switch 126.

The closing of the contacts 128 and 130 connects line 136 having resistor $R_4$ to an A.C. voltage source 138 through line 140. Line 136 leads to a bridge circuit indicated generally by numeral 142. The bridge circuit includes the two upper arms 144 and 146 having diodes 148 and 150 therein, respectively. The bridge circuit also includes the two lower arms 152 and 154 having diodes 156 and 158, respectively. A stepping relay 160 is connected to the junction 162 of arm 144 and arm 152 and also to the junction 164 of arm 146 and arm 154.

It can be seen that the arrangement of the bridge 142 is such that when the switch 126 is closed by the opening of the switch 114 by the operator, a signal of the proper polarity is fed through the stepping relay 160.

The application of a signal through relay 160 operates in a one-step operation, the switches 46 and 74 which are connected together by a common shaft indicated by the broken line 166. Thus, if, during the measurements of the acoustic impedance and the reciprocal of the velocity through the subsurface formations, it is desired to calibrate the traces recorded, the operator opens switch 114. This causes switch 126 to close its contacts 128 and 130 resulting in the movement of switches 46 and 74 from a position shown in the figure into contact with contacts 168 and 170, respectively.

When switches 46 and 74 contact contacts 168 and 170, respectively, a calibrating signal of constant frequency is fed from the calibration oscillator 172 through lines 174 and 176 and 178 to the acoustic impedance and reciprocal of velocity measuring circuits. The first calibration pulse to occur after oscillator 34 has set flip-flop 60 will reset the flip-flop 60, which feeds a signal through line 64 to flip-flop 66 thus producing an output signal from flip-flop 66 through line 68 to the integrator 70. The next calibration pulse will return the flip-flop 66 to its initial state. Hence, the calibration signal for the reciprocal of $$\left(\frac{1}{v}\right)$$

signal is always a constant amount if the circuit is working properly. Switch 114 is then closed.

The next opening of switch 114 causes the relay 160 to operate the switches 46 and 74 to contact contacts 180 and 182, respectively. This provides a zero signal level reference signal. Thus, at the will of the operator, zero signal level can be obtained as a reference for the $(dv)$ curve, and by another switch operation, a fixed, calibrated signal level can be injected from the calibration oscillator. This level will normally correspond to the level obtained, theoretically, in an "infinite medium." A practical approximation of this value can be obtained by observing this signal level obtained when the logger is operated in a large body of water. Since the acoustic impedance circuits are linear, the two reference signals form a means of determining the peak signal obtained from each formation on the log.

In operation, assume a signal of the proper polarity, say a positive signal, has been fed from oscillator 34 through line 36 to the sound source 24. This signal is also fed through line 62 to flip-flop 60 to permit the flip-flop 60 to receive pulses fed to it through line 58. As the sound from source 24 is detected by detector 26, the resulting signal is fed through amplifier 50 and Schmitt trigger 56 to the flip-flop 60 causing flip-flop 60 to change its state and feed a signal through line 64 to flip-flop 66 thus changing the state of flip-flop 66. As the sound is subsequently detected by detector 28, a pulse is fed through amplifier 78 and Schmitt trigger 82 to the flip-flop 66 thus returning flip-flop 66 to its original state. The pulse from flip-flop 66 has been fed through line 68 to the integrator 70.

When oscillator 34 switches to a negative polarity, the negative signal through line 86 to integrator 70 short circuits the relay included as a part of integrator 70 and the amount of stored signal in the capacitor and integrator 70 is fed through voltmeter 88 to the swinging galvanometer 94. The stored signal is also fed to the recorder 120.

The pulse fed from detector 26 and through amplifier 50 is also conducted through line 98 to the voltmeter 100. This pulse thus becomes one of the pulses averaged over a period of time to obtain an indication of the acoustic impedance of the subsurface formation. As formerly stated, a curve proportional to the acoustic impedance is measured by the galvanometer G. The pulse is also fed through line 122 to the recorder 120 so that a direct indication of the density of the subsurface formation is obtained.

When the curves are to be calibrated, the operator opens switch 114 to move switches 46 and 74 to contacts 168 and 170, respectively, and by a later opening of the switch 114, switches 46 and 74 are moved to ground contacts 180 and 182, respectively.

As shown, all of the electronic equipment may be located within the logging tool except for the 400 cycle per second voltage source 138, and the recording equipment.

We claim:
1. In a well logging system in which at least one sound detecting device is used to detect generated acoustic pulses and circuitry is included for obtaining and measuring an electrical quantity which is proportional to the reciprocal of the velocity of sound between two spaced-apart points in the subsurface, the improvement comprising: acoustic impedance measuring circuitry associated with said detecting device, a direct current signal magnitude measuring means in said acoustic impedance measuring circuitry for measuring the amplitudes of signals from the detecting device and producing output signals proportional to the acoustic impedance of the subsurface; and a recorder for recording a trace proportional to the product of its inputs connected to both the reciprocal of the velocity measuring circuitry and the acoustic impedance measuring circuitry, whereby the signals from the two circuits are fed to said recorder and a trace proportional to the density of the subsurface is obtained.

2. In a well logging system in which at least two detecting devices are used to detect generated acoustic pulses and circuitry is connected to said two detecting devices for obtaining and measuring an electrical quantity which is proportional to the reciprocal of the velocity of sound between two spaced-apart points in the subsurface formations equal to the separation of the detecting devices, the improvement comprising: acoustic impedance measuring circuitry associated with at least one of said detecting devices, a direct current signal magnitude measuring means in said acoustic impedance measuring circuitry for measuring the amplitudes of signals from the detecting device and producing output signals proportional to the acoustic impedance of the subsurface; and a recorder for recording a trace proportional to the product of its inputs connected to both the reciprocal of the velocity measuring circuitry and the acoustic impedance measuring circuitry, whereby the signals from the two circuits are fed to said recorder and a trace proportional to the density of the subsurface is obtained.

3. A well logging system in accordance with claim 2 wherein the direct current signal magnitude measuring means is a peak reading voltmeter.

References Cited by the Examiner
UNITED STATES PATENTS

| | | | |
|---|---|---|---|
| 2,191,120 | 2/40 | Slichter | 181—0.53 |
| 2,233,992 | 3/41 | Wyckoff | 181—0.53 |
| 2,704,364 | 3/55 | Summers | 181—0.53 |
| 2,708,485 | 5/55 | Vogel | 181—0.53 |
| 2,722,282 | 11/55 | McDonald | 181—0.53 |
| 2,931,455 | 4/60 | Loofbourrow | 181—0.53 |
| 2,938,592 | 5/60 | Charske et al. | 181—0.53 |

SAMUEL FEINBERG, *Primary Examiner.*
CHESTER L. JUSTUS, LAURENCE V. EFNER, *Examiners.*